US009558335B2

(12) United States Patent
Windell et al.

(10) Patent No.: US 9,558,335 B2
(45) Date of Patent: *Jan. 31, 2017

(54) SYSTEMS AND METHODS RELATED TO SECURITY CREDENTIALS

(71) Applicant: ALLSCRIPTS SOFTWARE, LLC, Chicago, IL (US)

(72) Inventors: David Thomas Windell, Raleigh, NC (US); Todd Michael Eischeid, Cary, NC (US); Scott David Bower, Raleigh, NC (US)

(73) Assignee: ALLSCRIPTS SOFTWARE, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/968,111

(22) Filed: Dec. 14, 2015

(65) Prior Publication Data
US 2016/0171193 A1 Jun. 16, 2016

Related U.S. Application Data

(63) Continuation of application No. 13/804,072, filed on Mar. 14, 2013, now Pat. No. 9,213,812, which is a continuation of application No. 13/732,141, filed on Dec. 31, 2012, now abandoned.

(60) Provisional application No. 61/747,142, filed on Dec. 28, 2012.

(51) Int. Cl.
*G06F 21/00* (2013.01)
*G06F 21/31* (2013.01)

(52) U.S. Cl.
CPC .................... *G06F 21/31* (2013.01)

(58) Field of Classification Search
CPC .................. G06F 21/31; H04L 63/08
USPC .............................................. 726/7
See application file for complete search history.

(56) References Cited

U.S. PATENT DOCUMENTS

| | | | |
|---|---|---|---|
| 6,535,850 B1 * | 3/2003 | Bayya | G10L 15/07 704/239 |
| 2002/0111792 A1 * | 8/2002 | Cherny | G06F 17/277 704/8 |
| 2008/0046366 A1 * | 2/2008 | Bemmel | G06Q 20/20 705/44 |
| 2008/0066167 A1 * | 3/2008 | Andri | G06F 21/46 726/5 |

(Continued)

*Primary Examiner* — Mahfuzur Rahman
(74) *Attorney, Agent, or Firm* — Tillman Wright, PLLC; Chad D. Tillman; Jeremy C. Doerre

(57) ABSTRACT

A method includes receiving, from a user via an electronic device, input representing a password to be utilized for an account; automatically determining, utilizing a processor, a complexity value for the input password; automatically determining, based on the determined complexity value, security settings for the account; receiving, from a user via an electronic device, input representing an attempt to login to the account, the input representing an attempt to login to the account including an attempted password; automatically determining that the attempted password does not match the password to be utilized for the account; and determining a course of action to take in response to the determination that the attempted password does not match the password to be utilized for the account, the course of action being determined based at least in part on the automatically determined security settings for the account.

13 Claims, 1 Drawing Sheet

(56) References Cited

U.S. PATENT DOCUMENTS

| | | | |
|---|---|---|---|
| 2009/0006856 A1* | 1/2009 | Abraham | G06F 21/55 |
| | | | 713/183 |
| 2014/0052688 A1* | 2/2014 | Bansal | G06N 7/02 |
| | | | 706/52 |
| 2015/0213246 A1* | 7/2015 | Turgeman | G06F 21/32 |
| | | | 726/23 |

* cited by examiner

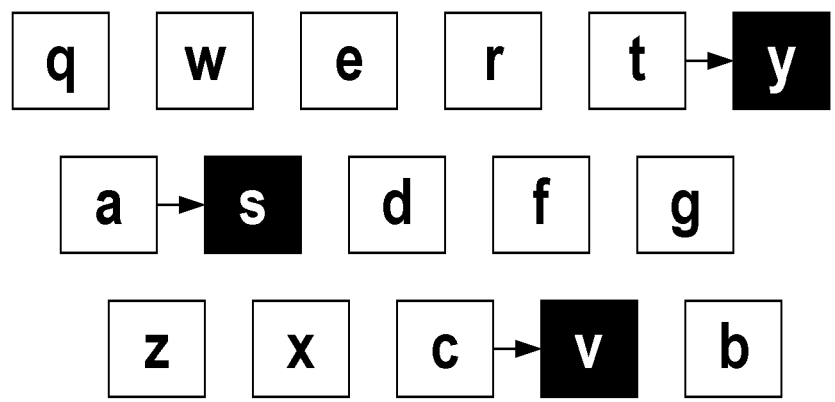

SYSTEMS AND METHODS RELATED TO SECURITY CREDENTIALS

CROSS-REFERENCE TO RELATED APPLICATION

The present application is a U.S. continuation patent application of, and claims priority under 35 U.S.C. §120 to, U.S. nonprovisional patent application Ser. No. 13/804,072, filed Mar. 14, 2013, which nonprovisional patent application and any patent application publications thereof are incorporated by reference herein, which '141 nonprovisional application is a U.S. continuation patent application of, and claims priority under 35 U.S.C. §120 to, U.S. nonprovisional patent application Ser. No. 13/732,141, filed Dec. 31, 2012, which nonprovisional patent application and any patent application publications thereof are incorporated by reference herein, and which '141 nonprovisional application is a U.S. nonprovisional patent application of, and claims priority under 35 U.S.C. §119(e) to, U.S. provisional patent application Ser. No. 61/747,142, filed Dec. 28, 2012, which provisional patent application is incorporated by reference herein, and which '072 nonprovisional application further is a U.S. nonprovisional patent application of, and claims priority under 35 U.S.C. §119(e) to, U.S. provisional patent application Ser. No. 61/747,142, filed Dec. 28, 2012.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to security credentials.

The use of passwords to ensure secure access to computer systems is well known. Unfortunately, it is not unusual for a user to misremember or mistype their password. Accordingly, many systems provide a user multiple attempts to enter their password. Sometimes, a hint is provided after a first incorrect entry. Other times, a user's only recourse might be to reset their password and have a new password emailed to them.

In order to try to prevent brute force attacks, some systems limit the number of attempts that a user can make. Other systems utilize a mechanism, such as CAPTCHA, which provides blurred strings a user must retype in order to try to prevent repeated, automated password entry.

A need exists for improvement in systems and methods related to security credentials. This, and other needs, are addressed by one or more aspects of the present invention.

SUMMARY OF THE INVENTION

The present invention includes many aspects and features. Moreover, while many aspects and features relate to, and are described in, the context of password security, the present invention is not limited to use only in this context, as will become apparent from the following summaries and detailed descriptions of aspects, features, and one or more embodiments of the present invention.

Accordingly, one aspect of the present invention relates to a method which includes receiving, from a user via an electronic device, input representing a password to be utilized for an account; automatically determining, utilizing a processor, a complexity value for the input password; automatically determining, based on the determined complexity value, security settings for the account; receiving, from a user via an electronic device, input representing an attempt to login to the account, the input representing an attempt to login to the account including an attempted password; automatically determining that the attempted password does not match the password to be utilized for the account; and determining a course of action to take in response to the determination that the attempted password does not match the password to be utilized for the account, the course of action being determined based at least in part on the automatically determined security settings for the account.

In a feature of this aspect, the electronic device comprises a tablet.

In a feature of this aspect, the electronic device comprises a desktop computer.

In a feature of this aspect, the electronic device comprises a laptop computer.

In a feature of this aspect, receiving input comprises receiving input via a touchscreen.

In a feature of this aspect, receiving input comprises receiving input via a keyboard.

In a feature of this aspect, receiving input comprises receiving input via a virtual keyboard displayed on a touchscreen.

In a feature of this aspect, the method further includes determining a proximity score comparing the attempted password to the actual password.

In at least some implementations, the proximity score is determined based on hashes.

In at least some implementations, the determined course of action to take in response to the determination that the attempted password does not match the password to be utilized for the account is at least partially informed by the proximity score.

In at least some implementations, the proximity score indicates a high degree of likelihood that the user who entered the input corresponding to the attempted password is in fact the holder of the account.

In at least some implementations, determining the proximity score comprises utilizing alphanumeric matching.

In at least some implementations, determining the proximity score comprises utilizing spatial proximity matching.

In at least some implementations, determining the proximity score comprises utilizing gestural matching.

In at least some implementations, determining the proximity score comprises utilizing natural language processing.

In a feature of this aspect, the method further includes making a probabilistic assessment of the likelihood that the user who entered the input corresponding to the attempted password is in fact the holder of the account.

Another aspect relates to a method which includes receiving, from a user via an electronic device, input representing a password to be utilized for an account; automatically determining, utilizing a processor, a complexity value for the input password; automatically determining, based on the determined complexity value, security settings for the account; receiving, from a user via an electronic device, input representing an attempt to login to the account, the input representing an attempt to login to the account including an attempted password; automatically determining that the attempted password does not match the password to be utilized for the account; and determining a proximity score comparing the attempted password to the actual password.

In a feature of this aspect, determining the proximity score comprises utilizing alphanumeric matching.

In a feature of this aspect, determining the proximity score comprises utilizing spatial proximity matching.

In a feature of this aspect, determining the proximity score comprises utilizing gestural matching.

In a feature of this aspect, determining the proximity score comprises utilizing natural language processing.

Another aspect relates to a method comprising receiving, from a user via an electronic device, input representing a password to be utilized for an account; automatically determining, utilizing a processor, a complexity value for the input password; automatically determining, based on the determined complexity value, security settings for the account; receiving, from a user via an electronic device, input representing an attempt to login to the account, the input representing an attempt to login to the account including an attempted password; automatically determining that the attempted password does not match the password to be utilized for the account; and determining a probability of the likelihood that the user who entered the input corresponding to the attempted password is in fact the holder of the account.

Another aspect relates to a computer readable medium containing computer executable instructions for performing a disclosed method.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein:

FIG. 1 illustrates how potential error in entering the string "cat" could result in the string "vsy".

DETAILED DESCRIPTION

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

In one or more preferred implementations, an intelligent system provides system level tolerance for incorrect user input of login or access credentials. Preferably, such a system utilizes methodologies that together create a tool that allows users to bear less burden in remembering, storing and accurately entering login credentials. In one or more preferred implementations, software provides a flexible mechanism for determining when (or how severely) a user is penalized for entering incorrect security credentials. In some preferred implementations, logic is utilized in analyzing a password entry attempt for proximity to the actual password. If the attempt is deemed close, or the system can determine with a relatively high degree of probability that the user who entered the incorrect attempt is indeed the actual user of the credentials, then penalties for incorrect passwords can be adjusted accordingly. One or more preferred implementations will now be described including (1) methodologies for recognizing attempted credentials and determining if credentials set by a user or given to the user by an administrator match the credentials attempted more than chance would indicate (e.g. could this potentially be the actual user based on what password he or she entered?); (2) methodologies for determining the probability of a match being correct (e.g. what is the probability, and/or level of certainty, that this is a particular authorized user?); (3) ways to set rules for adjusting penalties on the user for presenting incorrect password attempts (e.g. based on the level of certainty that the system has that this is the correct user, the system adjusts the security rules and may or may not inform the user of such rules change or give the user a security hint to help ensure that the user is not locked out of the system).

In one or more preferred implementations, each of these three sets of methodologies is implemented as a subsystem. Notably, such methodologies can be implemented in a variety of combinations and ways, and the preferred implementation for a given situation will depend on the importance of secure login/access to the information within that application. Exemplary potential implementations will now be described, ranging from low security, or low need for privacy, implementations to very highly secure and sophisticated implementations.

In one or more preferred implementations, a system utilizes very simple algorithms to compare an attempted password to a stored password. Some exemplary such algorithms utilize alphanumeric matching. This might involve, for example, determining how many letters/numbers match between a stored password and an entered password attempt. Further, some exemplary such algorithms utilize spatial proximity matching. This might involve, for example, determining that a stored password is "cat" and an attempted password, "cay", could be a mistaken attempted entry of "cat" because the y neighbors the t in a traditional QWERTY keyboard. This could additionally involve looking for transform errors such as mismatched capitalization or missed shifts (e.g. 7 instead of &).

In one or more preferred implementations, more complex comparison techniques are utilized including building off spatial proximity matching to test for gestural matching. For example, if a user's stored password is "cat" and they enter "vsy", the system could recognize that on a QWERTY keyboard the user's finger positions could have been shifted one key to the right, as illustrated in FIG. 1. Similarly, a gestural comparison could notice if a user's stored password is a physical pattern such as "zaq12wsx", but the user enters "xsw23edc".

In at least some implementations, text representing the password is available to the system for such a comparison, while in at least some other implementations a hash or other methodology is utilized for which proximity or similarity to a particular hash result implies proximity or similarity of the underlying attempt and the underlying password. Alternatively or additionally, at the time that a hash is generated and stored for a password, related hashes for possible typographical errors or other potential similar errors could also be generated and stored.

In one or more preferred implementations, a system utilizes natural language processing (NLP), e.g. using context word definitions to gain an awareness of semantic meanings, to look for similarities between stored passwords and password attempts. For example, if a user has a stored password of "November18th1980", but enters "11/18/1980", the system preferably understands that both strings refer to the same date. More elegant NLP applications preferably use context to understand the semantic differences between such stored passwords as "Ilovemydaughter" and "Ilovemyson", and utilize such similarities to conclude with some level of confidence that the secure user is attempting to input the correct password.

In one or more preferred implementations, an application is given appropriate information to make a probabilistic assessment on the likelihood that the person who input a password is the actual authorized user. For example, in the simple case of alphanumeric matching where the correct password is "cat", an attempt of "car" is much more likely to be the correct user than an attempt of "bin".

In one or more preferred implementations, a system counts the number of matched characters between a password and an attempt, and the more characters that match, the higher the probability assigned that the attempt is a legitimate attempt by the authorized user.

In one or more implementations utilizing more complex algorithms, such as, for example, implementations utilizing NLP, the system preferably uses semantic meaning to understand how close the match is. Returning to the example of a stored password of "November18th1980", in a preferred implementation, the system will consider "11/18/1980" a closer match than "24-April-2005". Some preferred implementations utilize even more complex semantic matching using readily available sophisticated NLP technology.

In one or more preferred implementations, once a system recognizes that a password attempt was likely entered by an authorized user, and has a defined level of confidence in this recognition, the system dynamically alters security rules based on the proximal attempt.

As an exemplary case, consider a simple but secure system that locks out a user after a single incorrect entry of login credentials, which then requires a password reset, intervention by a system administrator, or the cancellation of the account. In a preferred implementation, the system determines a number of characters in an attempted password that match the stored password, and, for each correct character, the user receives an additional attempt at providing the correct password. For example, if the stored password is "cat", and a user enters "hit", the user would receive one extra attempt, whereas if they had entered "bat", they would have received two.

Returning once more to the date example outlined above, if a stored password is "November18th1980", and a user enters "14-April-2005", although the entry is a date similarly to the password, in a high security setting, this may not be considered a close enough match and there may be no rule change in the security system. Alternatively, if the need for security in the system is minimal, the system might recognize that they entered a date, and that the target password is a date, and consequently grant the user an extra attempt before being locked out.

In one or more preferred implementations, a system utilizes NLP to determine the probability that a user who makes an attempt is indeed the account holder, thus allowing for incredible flexibility in methodologies by which users are identified, probabilities are calculated, and security rules are changed. For example, returning to the "November18th1980" case, using NLP a system could, if a high degree of confidence related to an attempt is determined in a low security setting, provide a user with a meaningful hint. In such example, if a user enters "November17th1980", the system could prompt the user with a message such as: "Here's what you entered _____, it looks like you were off by one letter somewhere. Let's try again."

Additionally, in one or more preferred implementations, a system is configured to remember patterns of incorrectly entered passwords and alter rules based on those mistakes. For example, if a user often uses two systems (A & B), and consistently types system B's password into system A's login, system A could "learn" this behavior and change rules accordingly (e.g. perhaps it doesn't count an attempt representing the repeatedly attempted password for system A against a five attempt limit allowed before system lockout). Such example illustrates the use of intelligence or learning for password attempt forgiveness.

In various preferred implementations, methodologies disclosed herein help address issues related to forgotten passwords (especially cases such as the mix-up of caps and other transforms), as well as common typographical errors, and format errors.

In one or more preferred implementation, methodologies disclosed herein are utilized in a healthcare context. Shared workstations are common in the healthcare industry. Further, it is very common for healthcare applications to require a password to be entered before use. In some hospitals, there are computer terminals in each patient room, wherein nurses or providers will login and alter a patient record, order tests, order meds, ad infinitum, and log out when they are finished. Such terminals can also be found in the hallways and nurses stations of hospitals and ambulatory clinics. In one or more preferred implementations, methodologies disclosed herein are utilized for such workstations and/or computer applications.

Methodologies disclosed herein are preferably utilized in settings where healthcare providers utilize several programs (such as, for example, an HER in a patient's room and a bed management program at a nurses' station), as, in such cases, it is not uncommon for passwords to be mismatched for any number of reasons, which could lead to one system's password being attempted during login to another system.

Methodologies disclosed herein are obviously applicable outside of a healthcare context as well, however. Further, in one or more preferred implementations, methodologies disclosed herein are utilized in combination and/or coordination with other security technologies and methodologies (e.g. CAPTCHA proofs).

For example, in one or more preferred implementations involving a program or application which includes a password strength indicator/synthesizer (e.g. depicting entered passwords as having one of three levels of password strength: red or weak, yellow or average, and green or strong), a computed strength of a user's password is also used to indicate how lenient/stringent the system is in its "forgiveness" of incorrect attempts. In some preferred implementations, if it is determined that a user has gone to some length to have created a very high security password, this information is utilized to determine that an incorrect attempt, even if very close to the actual password, should lead to a strict penalty (e.g. locking access, wiping a storage drive, etc).

As an example, consider an individual who is setting the password for his webmail application who chooses "yellow" as his password. When initially setting up this password, the system shows the user onscreen that this is a relatively weak choice of characters, but perhaps the user is more concerned with remembering this password than in security since this is his personal email account. In this case, if the user returns to the application at a later time to log into the interface and they happen to mistakenly type "blue" as their password upon login, the system (realizing that the user, in choosing a weak password, is not very concerned with security) might prompt the user's memory with a message such as the following: "Close, but not quite . . . the correct password is a color, but not the one you typed here. Hint: Think of the sun."

Conversely, if the user originally chose a high security password such as "November18th1980$", this can be interpreted by the system as an indication that security is important to the user. Should the user return to the application later and type "November16th1980$", the system, realizing that security is important to the user, might present the following message: "Incorrect attempt. You've been locked out of the system and your disk drive will be wiped clean of all data in 24 hours. Please call your system administrator and verify your identity before this time in order to abort the pending data wipe. 23:59, 23:58, 23:57 . . . ", and take the appropriate related actions.

In one or more preferred implementations, upon a user initially setting up a password, the system stores an indication of the complexity of the user's password, for later use in determining security settings (e.g. associated with password entry), and/or stores an indication of security settings (e.g. associated with password entry) determined based on the complexity of the user's password.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method comprising:
   (a) receiving, from a user via an electronic device, input representing an attempt to login to an account, the input representing an attempt to login to the account including an attempted password;

(b) automatically determining that the attempted password does not match an actual password for the account;
(c) determining a proximity score comparing the attempted password to the actual password, wherein the determined proximity score indicates a degree of likelihood that the user who entered the input corresponding to the attempted password is in fact the holder of the account; and
(d) increasing, based on the determined proximity score, a number of password attempts allowed;
(e) wherein the number of password attempts allowed is increased a variable amount with a higher determined proximity score resulting in a greater increase;
(f) wherein determining the proximity score comprises utilizing natural language processing.

2. The method of claim 1, wherein the electronic device comprises a tablet.

3. The method of claim 1, wherein the electronic device comprises a desktop or laptop computer.

4. The method of claim 1, wherein receiving input comprises receiving input via a touchscreen.

5. The method of claim 1, wherein receiving input comprises receiving input via a keyboard.

6. The method of claim 1, wherein receiving input comprises receiving input via a virtual keyboard displayed on a touchscreen.

7. A method comprising:
(a) receiving, from a user via an electronic device, input representing an attempt to login to an account, the input representing an attempt to login to the account including an attempted password;
(b) automatically determining that the attempted password does not match an actual password for the account;
(c) determining a proximity score comparing the attempted password to the actual password, wherein the determined proximity score indicates a degree of likelihood that the user who entered the input corresponding to the attempted password is in fact the holder of the account; and
(d) increasing, based on the determined proximity score, a number of password attempts allowed;
(e) wherein the number of password attempts allowed is increased a variable amount with a higher determined proximity score resulting in a greater increase;
(f) wherein the proximity score is determined based on hashes.

8. The method of claim 1, wherein the proximity score indicates a high degree of likelihood that the user who entered the input corresponding to the attempted password is in fact the holder of the account.

9. The method of claim 1, wherein determining the proximity score comprises utilizing alphanumeric matching.

10. The method of claim 1, wherein determining the proximity score comprises utilizing spatial proximity matching.

11. The method of claim 1, wherein determining the proximity score comprises utilizing gestural matching.

12. The method of claim 1, wherein determining the proximity score comprises utilizing natural language processing.

13. The method of claim 1, wherein the method further includes making a probabilistic assessment of the likelihood that the user who entered the input corresponding to the attempted password is in fact the holder of the account.

* * * * *